(12) United States Patent
Li et al.

(10) Patent No.: US 10,813,104 B2
(45) Date of Patent: Oct. 20, 2020

(54) RESOURCE ALLOCATION METHOD AND SYSTEM IN WIRELESS MOBILE COMMUNICATION

(71) Applicant: JRD Communication Inc., Shenzhen (CN)

(72) Inventors: Zhenhong Li, Shenzhen (CN); Yanbo Tang, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 0 days.

(21) Appl. No.: 16/314,682

(22) PCT Filed: Jul. 11, 2017

(86) PCT No.: PCT/CN2017/092540
§ 371 (c)(1),
(2) Date: Jan. 2, 2019

(87) PCT Pub. No.: WO2018/010649
PCT Pub. Date: Jan. 18, 2018

(65) Prior Publication Data
US 2019/0268915 A1 Aug. 29, 2019

(30) Foreign Application Priority Data
Jul. 12, 2016 (CN) .......................... 2016 1 0544877

(51) Int. Cl.
*H04W 72/10* (2009.01)
*H04W 28/16* (2009.01)
(Continued)

(52) U.S. Cl.
CPC .......... *H04W 72/10* (2013.01); *H04W 28/16* (2013.01); *H04W 48/14* (2013.01); *H04W 48/16* (2013.01); *H04W 74/08* (2013.01)

(58) Field of Classification Search
None
See application file for complete search history.

(56) References Cited

U.S. PATENT DOCUMENTS 8,897,148 B2   11/2014  Patil et al.
10,536,947 B2 *  1/2020  Martin .................. H04W 4/027
(Continued)

FOREIGN PATENT DOCUMENTS

| CN | 1570865  | 1/2005 |
|----|----------|--------|
| CN | 101841919 | 9/2010 |

(Continued)

OTHER PUBLICATIONS

International Search Report and the Written Opinion dated Sep. 20, 2017 From the International Searching Authority Re. Application No. PCT/CN2017/092540 and Its Translation of Search Report Into English. (10 Pages).

*Primary Examiner* — Hong S Cho

(57) ABSTRACT

A method for allocating resources in a wireless mobile communication is provided. The method includes preconfiguring, by a base station, a priority for each data resource pool set; configuring, by a base station, a data transmission period and resource allocation for the data resource pool set based on the priority of the data resource pool set; and acquiring, by a mobile equipment, a number of data resource pool sets and its corresponding relation with its configured priority in the wireless mobile communication.

9 Claims, 3 Drawing Sheets

(51) Int. Cl.
*H04W 48/14* (2009.01)
*H04W 74/08* (2009.01)
*H04W 48/16* (2009.01)

(56) References Cited

U.S. PATENT DOCUMENTS

| | | |
|---|---|---|
| 2002/0147030 A1 | 10/2002 | Chun et al. |
| 2008/0225822 A1* | 9/2008 | Zhang ................ H04L 5/023 370/343 |
| 2010/0058317 A1 | 3/2010 | Braams |
| 2016/0338078 A1* | 11/2016 | Wang ................ H04W 72/085 |
| 2017/0245292 A1* | 8/2017 | Agiwal ............... H04W 28/02 |
| 2017/0303291 A1* | 10/2017 | Chae ................. H04W 72/04 |

FOREIGN PATENT DOCUMENTS

| | | |
|---|---|---|
| CN | 101925138 | 12/2010 |
| CN | 102056156 | 5/2011 |
| CN | 102171652 | 8/2011 |
| CN | 102196447 | 9/2011 |
| CN | 103179617 | 6/2013 |
| CN | 103229579 | 7/2013 |
| CN | 104102499 | 10/2014 |
| CN | 105975850 | 9/2016 |
| CN | 106060947 | 10/2016 |
| EP | 3200534 | 8/2017 |
| WO | WO 2016/048096 | 3/2016 |
| WO | WO 2018/001365 | 1/2018 |
| WO | WO 2018/010649 | 1/2018 |

* cited by examiner

RESOURCE ALLOCATION METHOD AND SYSTEM IN WIRELESS MOBILE COMMUNICATION

RELATED APPLICATIONS

This application is a National Phase of PCT Patent Application No. PCT/CN2017/092540 having International filing date of Jul. 11, 2017, which claims the benefit of priority of Chinese Patent Application No. 201610544877.6 filed on Jul. 12, 2016. The contents of the above applications are all incorporated by reference as if fully set forth herein in their entirety.

FIELD AND BACKGROUND OF THE INVENTION

The present disclosure relates to the field of wireless mobile communication technologies, and more particularly to a method and a system for allocating resources in a wireless mobile communication.

At the present time, according to the standard 36.885 of wireless access networks, the uu-based (based on open interfaces) V2X (Vehicle to X) Internet of Vehicles applications have related to different V2X scenes.

As shown in FIG. 1 for the first application scene of the Internet of Vehicles communication, when a user equipment sends V2X information to the additional connected user equipment, one of the received user equipment (UE) receives V2X information through connection, a Road Side Unit (RSU) having a UE type sends the received V2X information to the LTE wireless mobile communication network through an uplink, and the wireless mobile communication network sends the V2X information that passes through a Side-Link (SL) to a number of local user equipment through a downlink after receiving the V2X information from the RSU having the UE type. The SL is a connection method for transmitting a wireless signal.

As shown in FIG. 2 for the second application scene of the Internet of Vehicles communication, a user equipment sends V2X information to a wireless mobile communication network through an uplink, and the wireless mobile communication network sends the V2X information to one or more RSUs having a user equipment type, and then the RSU having the user equipment type sends the V2X information to additional user equipment through the SL.

To support the first application scene and the second application scene, the wireless mobile communication network performs the messages received through an uplink and the messages communicated through a V2X downlink. For the downlink, an E-UTRAN wireless mobile communication network may use a broadcasting mechanism. In the SL method, the RSU having the user equipment type transmits a large amount of data to a number of user equipment through a downlink, and thus the RSU having the user equipment type receives a large amount of data from a number of user equipment.

The V2X service sets have very stringent requirements in terms of latency. For example, for Co-operative Awareness Message (CAM), it is required that the latency of information should not exceed 100 ms. In R2-161436, to sum up the first scene and the related configuration latency analysis, for the first scene, the latency of 100 ms cannot satisfy the requirements on basic latency according to the current uu-based mechanisms and D2D communication, wherein D2D means Device-to-Device.

For D2D connection, two methods of resource allocation are proposed here:
1) Distributed Resource Allocation Distributed resource allocation described in Proximity Service (ProSe) communication is realized through ProSe mode 2 resource allocation, wherein a user randomly selects transmission resources from a resource bank through System Information Block 18 (SIB18) under the instruction of a base station.

2) Centralized Resource Allocation

Centralized resource allocation described in Rel-12 ProSe communication is realized through ProSe mode 1 resource allocation, wherein all the frequency/time resources constitute a resource bank, and the base station controls the use of the resource bank.

Based on the characteristics of V2X communication, such as high user mobility, high transmission load and stringent latency requirements, etc., it is necessary for V2X communication to enhance resource allocation mechanism. As V2X should be designed to support the hundreds of vehicles in each unit, the vehicles have different types of transmission and requirements of QoS. In addition, V2X is further challenged on the performance of mobility.

There are two main types of the centralized resource allocation:

1) Dynamic Resource Allocation Served as Traditional ProSe Mode 1 Mechanism

For a single V2X transmission mode, a single V2X, that is provided and authorized by the base station, is effective in the next Scheduling Control (SC) period. There are some shortcomings in the mode, such as some channel expenses due to the authorization of Downlink Control Information (DCI5) by Scheduling Request (SR), Sidelink Buffer Status Report (SL BSR) and Physical Downlink Control Channel (PDCCH) in each SC period. However, it is beneficial to Event-trig message with stringent latency requirements, such as Decentralized Environmental Notification Message (DENM).

2) Quasi SPS (Semi-Persistent Scheduling) Resource Allocation

An authorization of V2X is effective before receiving additional notification of the mixed transmission occasion which crosses a number of SC periods. The mode means there would be some redundant latency due to the difficulties of matching Signaling Point Code (SPC) with actual transmission period. Furthermore, it also means there would be some waste of resources when there is no user who transmits data through Program Counter (PC5). However, it is beneficial to periodic message, such as Co-operative Awareness Message (CAM).

CAM is a kind of heartbeat message. Each communication channel is broadcast periodically to its neighboring channel and provides the existence of information, such as location, temperature and basic status, etc.

Conversely, DENMs is Event-trig information that is used to remind the user of dangerous incident that exists in channels. Both CAM and DENM transmit the information to vehicles in a specific geographic region. CAM (Single-hop) is transmitted to neighboring channels, and DENM (Multi-hop) is transmitted to affected channels. Apparently, DENM message and CAM message have different priorities in V2X communication system.

Furthermore, the resource allocation, that is served as 36.885 Scheduling Assignment (SA), is the main trend at the present time. Each data transmission is scheduled by a SA. After decoding the related SA, the user can know the location of frequency field of the data transmission within the shortest time. For SA mode, many resource banks and SA banks are still open. Cross-collision may occur between the frequency fields of SA of the users, no matter which SA will be used, especially in case of high load. Notwithstanding that it is beneficial to avoid collisions of frequency field by combining collision avoidance with enhanced random resource allocation, such as a user only selects randomly from the rest of resources when detecting the exclusive resources occupied by other users; however, the random selection would also most probably result in collisions during the high load.

SUMMARY OF THE INVENTION

An object of the present invention is to provide a method and a system for allocating resources in a wireless mobile communication to solve the shortcomings of the conventional technology. Conventionally, it can't meet the basic latency requirements of the current D2D communication, owing to the resources allocation with a long latency and a big signaling unlock while in the wireless transmission.

The technical propose provided in the present invention to achieve the above-mentioned object is:

A method for allocating resources in a wireless mobile communication, the method comprising: acquiring preset priority configuration information from a plurality of data resource pool sets; configuring a data transmission period and a resource corresponding to the plurality of data resource pool sets based on the preset priority configuration information of the plurality of data resource pool sets; receiving resource allocation request information from a mobile equipment; and sending the data transmission period and the resource corresponding to the data resource pool sets satisfying the resource allocation request information to the mobile equipment.

A method for allocating resources in a wireless mobile communication, the method comprising: (A) preconfiguring, by a base station, a priority for each data resource pool set; (B) configuring, by a base station, a data transmission period and resource allocation for the data resource pool set based on the priority of the data resource pool set; and (C) acquiring, by a mobile equipment, a number of data resource pool sets and its corresponding relation with its configured priority in the wireless mobile communication.

The method for allocating resources in a wireless mobile communication, further comprising, prior to step (A), the step of: (S) predefining priorities of the data resource pool sets by three levels having a first priority, a second priority and a third priority.

The method for allocating resources in a wireless mobile communication, wherein step (B) comprises: (B1) acquiring and determining the priority of the present data resource pool set by a base station; (B2) if the priority of the present data resource pool set is the first priority, adopting a SPSI resource allocation method for the present data resource pool set and acquiring the resource use with regard to the next data transmission period at the beginning of the first data transmission period; (B3) if the priority of the present data resource pool set is the second priority, adopting a plan-based resource allocation method for the present data resource pool set and utilizing the plan-based resource allocation method to allocating the second data transmission period at the beginning of the second data transmission period; and (B4) if the priority of the present data resource pool set is the third priority, adopting a contention-based resource allocation method for the present data resource pool set and utilizing the contention-based resource allocation method to allocating the third data transmission period at the beginning of the third data transmission period.

The method for allocating resources in a wireless mobile communication, wherein in step (B2), the SPSI comprises a self-resource indicator for indicating its own data or the data of other mobile equipment is transmitting and a data transmission indicator for indicating the duration of data transmission.

The method for allocating resources in a wireless mobile communication, wherein in step (B4), the contention-based resource allocation method comprises a data handshake method, the data handshake method comprises: (B41) sending, by the mobile equipment, its own equipment ID, a repeater ID and the desired resource allocation request information to the base station; (B42) determining, by the base station, whether the repeater accepts the resource allocation of the resource allocation request information, and if the repeater totally accepts the resource allocation, retaining the resource allocation, and if the repeater doesn't accept the resource allocation and provides new resources to the mobile equipment, assigning new resource allocation while confirming the resources; and (B43) receiving, by the mobile equipment, resource confirmation information from the repeater and transmitting a data based on the agreed resource allocation of the resource confirmation information during the transmission of the data.

A system for allocating resources in a wireless mobile communication, comprising: one or more processors; a memory; and one or more applications stored in the memory and configured to be executed by the processors, wherein the one or more applications comprises the operating instructions for performing the steps of: acquiring preset priority configuration information from a plurality of data resource pool sets; configuring a data transmission period and a resource corresponding to the plurality of data resource pool sets based on the preset priority configuration information of the plurality of data resource pool sets; receiving resource allocation request information from a mobile equipment; and sending the data transmission period and the resource corresponding to the data resource pool sets satisfying the resource allocation request information to the mobile equipment.

In the system for allocating resources in a wireless mobile communication, wherein prior to the step of acquiring preset priority configuration information from the plurality of data resource pool sets, the processors are configured for performing the step of: predefining priorities of the data resource pool sets by three levels having a first priority, a second priority and a third priority.

In the system for allocating resources in a wireless mobile communication, wherein in the step of configuring the data transmission period and the resource corresponding to the plurality of data resource pool sets based on the preset priority configuration information of the plurality of data resource pool sets, the processors are configured for performing the steps of: (B1) acquiring and determining the priority of the present data resource pool set by a base station; (B2) if the priority of the present data resource pool set is the first priority, adopting an SPSI resource allocation method for the present data resource pool set and acquiring the resource use with regard to the next data transmission period at the beginning of the first data transmission period; (B3) if the priority of the present data resource pool set is the second priority, adopting a plan-based resource allocation method for the present data resource pool set and utilizing the plan-based resource allocation method to allocating the second data transmission period at the beginning of the second data transmission period; and (B4) if the priority of the present data resource pool set is the third priority, adopting a contention-based resource allocation method for the present data resource pool set and utilizing the contention-based resource allocation method to allocating the third data transmission period at the beginning of the third data transmission period.

In the system for allocating resources in a wireless mobile communication, wherein in step (B2), the SPSI comprises a self-resource indicator for indicating its own data or the data of other mobile equipment is transmitting and a data transmission indicator for indicating the duration of data transmission.

In the system for allocating resources in a wireless mobile communication, wherein in a data handshake method comprised in the contention-based resource allocation method in step (B4), the processors are configured for performing the steps of: (B41) sending, by the mobile equipment, its own equipment ID, a repeater ID and the desired resource allocation request information to the base station; (B42) determining, by the base station, whether the repeater accepts the resource allocation of the resource allocation request information, and if the repeater totally accepts the resource allocation, retaining the resource allocation, and if the repeater doesn't accept the resource allocation and provides new resources to the mobile equipment, assigning new resource allocation while confirming the resources; and (B43) receiving, by the mobile equipment, resource confirmation information from the repeater and transmitting a data based on the agreed resource allocation of the resource confirmation information during the transmission of the data.

The present invention provides a method and a system for allocating resources in a wireless mobile communication. Since the transmission period is configurable and could be updated based on the priority, the user equipment (UE) transmits the data without waiting for a very long time. Thus, the mixed resources allocation method of the present invention can reduce transmission latency. Furthermore, indicating the resource use with regard to the next data transmission period in the transmission process in order that other users utilize the idle resources better under the condition that they don't occupy more signaling from the network side and the probabilities of collision is low. The transmission latency is therefore improved.

DESCRIPTION OF SPECIFIC EMBODIMENTS OF THE INVENTION

To ensure the objects, the technical solutions and the effects of the invention are clearer and more specific, explaining the invention in detail further below. It should be understood that the embodiments described herein are merely used to explaining the invention and not used to limit the invention.

The invention provides a method for allocating resources in a wireless mobile communication, wherein the method comprises: acquiring preset priority configuration information from a plurality of data resource pool sets; configuring a data transmission period and a resource corresponding to the plurality of data resource pool sets based on the preset priority configuration information of the plurality of data resource pool sets; receiving resource allocation request information from a mobile equipment; and sending the data transmission period and the resource corresponding to the data resource pool sets satisfying the resource allocation request information to the mobile equipment.

Figure 1:
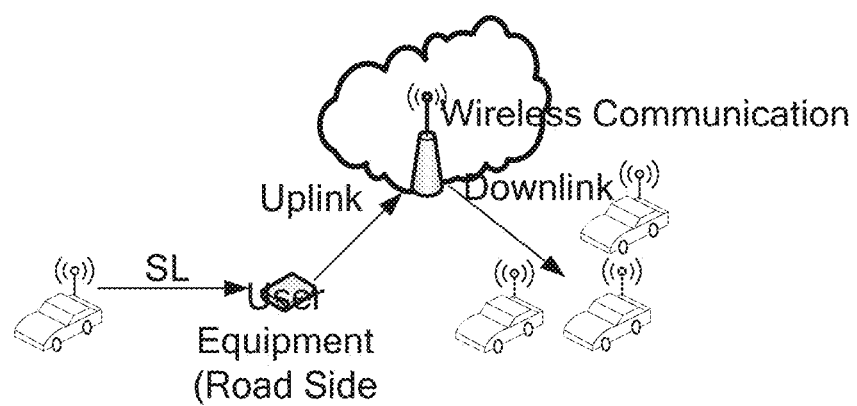
FIG. 1 is a schematic diagram of the first application scene of the Internet of Vehicles communication in current technologies.
Figure 2:
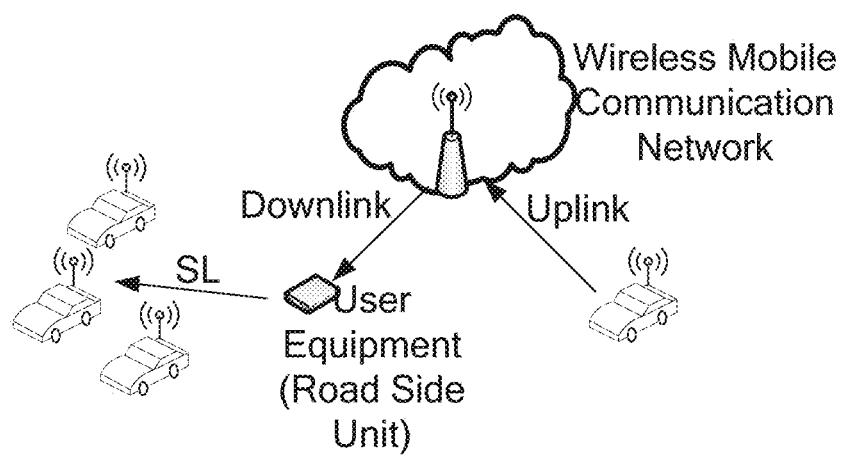
FIG. 2 is a schematic diagram of the second application scene of the Internet of Vehicles communication in current technologies.
Figure 3:
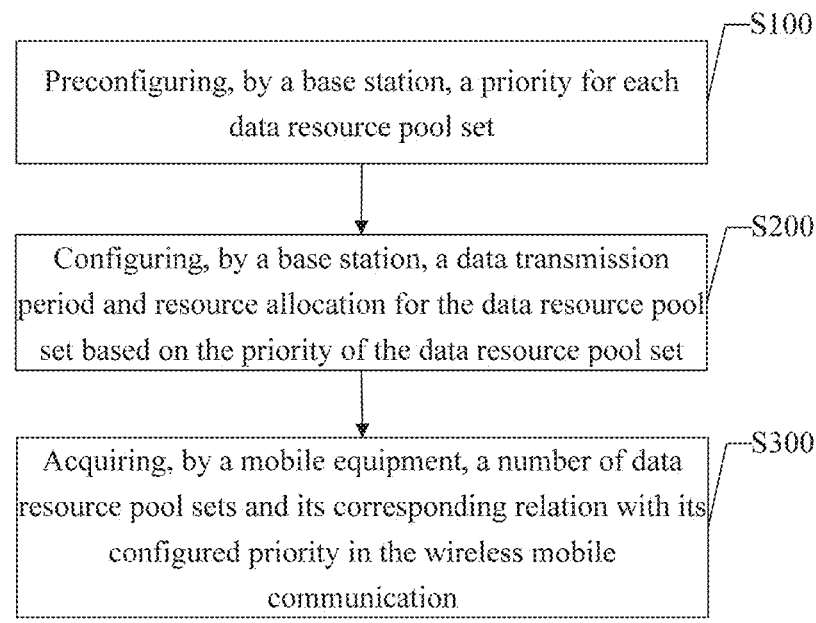
FIG. 3 is a flow chart of a method for allocating resources in a wireless mobile communication according to one preferred embodiment of the present invention.

The invention further provides a flow chart of a method for allocating resources in a wireless mobile communication according to one preferred embodiment of the present invention. As shown in FIG. 3, the method comprises:

Step S100: preconfiguring, by a base station, a priority for each data resource pool set. Specifically, the base station configures the priority of the data resource pool set for each device in advance.

Further, prior to step S100, the method comprises:

Step S1: predefining priorities of the data resource pool sets by three levels having a first priority, a second priority and a third priority.

In an embodiment of the invention, predefining the priorities by three levels having a first priority, a second priority and a third priority which correspond to a high priority, a medium priority and a low priority respectively. Namely, for the priorities, the first priority is greater than the second priority, and the second priority is greater than the third priority.

Step S200: configuring, by a base station, a data transmission period and resource allocation for the data resource pool set based on the priority of the data resource pool set. Specifically, both the transmission period and the method of allocating resources can be set through signaling. The signaling comprises Radio Resource Control (RRC) message and an executable signaling. Specifically, the data transmission period is configured through the RRC message, and the method of allocating resources is configured through the RRC message or the executable signaling. Furthermore, each data resource pool set owns the resource allocation configured through a high layer. For example, based on the priority, the data transmission period can be configured or reconfigured through the RRC message or any other executable signaling. Similarly, the method of allocating resources can also be configured or reconfigured through the RRC message or any other executable signaling.

Figure 4:
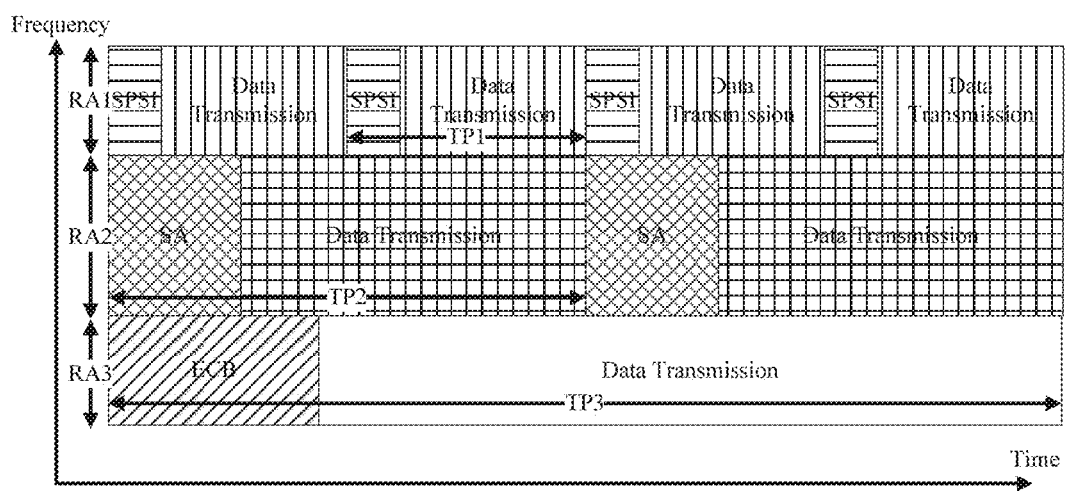
FIG. 4 is a schematic diagram of a mixed resources allocation method based on priorities, used in the method for allocating resources in a wireless mobile communication, according to one concrete application embodiment of the present invention.

As shown in FIG. 4, the service with high priority is denoted as RA1, and its transmission period is denoted as TP1. When transmitting the data, adopting Quasi-SPS resource allocation for the service with high priority. Comparing to the medium priority and the low priority, the transmission period TP1 is shortest. Furthermore, the SPS indicator (SPSI) is introduced at the beginning of the data transmission period. The SPS indicator is used for acquiring the resource use with regard to the next data transmission.

The service with medium priority is denoted as RA2, and its transmission period is denoted as TP2. When transmitting the data, adopting a plan-based resource allocation method for the service with medium priority RA2. The transmission period TP2 is longer than the transmission period TP1 of the service with high priority. Using a resource allocation method with Scheduling Assignment (SA) at the beginning of the data transmission period TP2.

The service with low priority is denoted as RA3, and its transmission period is denoted as TP3. When transmitting the data, adopting an Enhanced Contention Based (ECB) resource allocation method for the service with low priority RA3. The transmission period TP3 is longer than the transmission period TP2 of the service with medium priority. Using the Enhanced Contention Based resource allocation method at the beginning of the data transmission period.

Step S300: acquiring, by a mobile equipment, a number of data resource pool sets and its corresponding relation with its configured priority in the wireless mobile communication.

In an embodiment of the invention, the wireless mobile communication specifically means V2X communication. The data resource pool sets are the places used for storing the data. Each data resource pool set is related to a priority. For instance, if there are a plurality of data resource pool sets for V2X communication, each data resource pool set is respectively related to a priority. Starting from the service with higher priority, allocating the transmission period based on the priority, namely each priority has a different transmission time. In addition, the period of scheduling and indicating and their own formats are also different according to the priorities.

Further, step S200 specifically comprises:

Step S201: acquiring and determining the priority of the present data resource pool set by a base station.

Step S202: if the priority of the present data resource pool set is the first priority, adopting an SPSI resource allocation method for the present data resource pool set and acquiring the resource use with regard to the next data transmission period at the beginning of the first data transmission period.

Step S203: if the priority of the present data resource pool set is the second priority, adopting a plan-based resource allocation method for the present data resource pool set and utilizing the plan-based resource allocation method to allocating the second data transmission period at the beginning of the second data transmission period.

Step S204: if the priority of the present data resource pool set is the third priority, adopting a contention-based resource allocation method for the present data resource pool set and utilizing the contention-based resource allocation method to allocating the third data transmission period at the beginning of the third data transmission period.

In an embodiment of the invention, the first transmission period is smaller than the second transmission period, and the second transmission period is smaller than the third transmission period. In the following embodiment, it is assumed that the maximum transmission period of V2X transmission is 40 ms but is not limited to the value. The maximum transmission period can be set by the system according to its required QoS.

Without lack of generality, three priorities are assumed in the following embodiment. The first priority means the service with the highest priority, namely the most urgent service with stringent latency requirements. The third priority means the service with the lowest priority, namely the service with relaxed latency requirements. The number of priorities can be configured according to the system definition and the high layer architecture.

Figure 5:
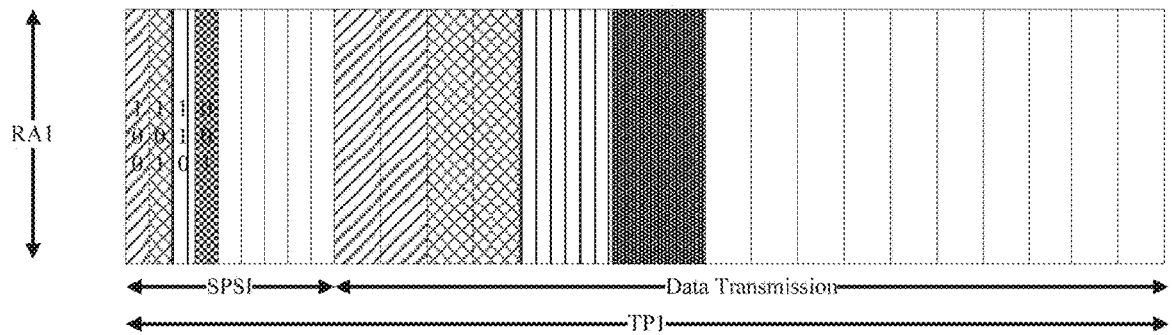
FIG. 5 is a schematic diagram of transmission based on SPS indication method, used in the method for allocating resources in a wireless mobile communication, according to one concrete application embodiment of the present invention.

Based on the historical load, the base station eNB (or Central Controller) allocates RA on the basis of the priorities, wherein the term "RA" means Resource Allocation. In the example shown in FIG. 5, for the service with the first priority, the base station eNB configures the transmission period TP1 to be 10 ms, thus there are four transmission periods in a period of 40 ms. The frequency field of RA is determined on the historical load of the most urgent message. The base station eNB can configure RA and the required transmission period based on the service with the first priority.

Transmission period TP1 can be divided into two parts, namely SPSI and data transmission. During the SPSI period, UE sends the SPSI which is used for indicating the occupied SPS gap of the next data transmission.

In step S202, the SPSI comprises a self-resource indicator for indicating its own data or the data of other mobile equipment is transmitting and a data transmission indicator for indicating the duration of data transmission. The SPSI indicator may comprise: 1) self-resource indicator; 2) data transmission period indicator. The self-resource indicator indicates its own data or the data of other mobile equipment is transmitting, and the data transmission period indicator indicates the duration of data transmission. If necessary, the SPSI indicator further comprise: a number of information elements, such as SPS-CNTI, resource allocation, etc., wherein SPS means Semi-persistent scheduling, and CNTI means Cell Radio Network Temporary Identifier. The high layer (the service with high priority) predefines the mapping relation between the specific SPSI resources of UE and its corresponding data transmission resources. On the other hand, the specific SPSI resources of UE may comprise resource information for data transmission. It is important that the SPS period of 40 ms will no longer satisfy the requirements in the current system because the general V2X services are more sensitive to latency. The high layer (the service with high priority) can predefine the V2X service with a shorter SPS period, for example, SPS period is defined as 10 ms or 20 ms based on the latency requirements of QoS.

For example, SPSI=100, the "1" of "100" indicates the data going to be transmitted is the data of the present UE, and the "00" of "100" indicates the data transmission happens in the present TP. In another example, SPS=101, the first "1" on the left side of "101" indicates the data going to be transmitted is the data of the present UE, and the "01" on the right side of "101" indicates the data transmission happens in the present TP and the next TP. In another example, SPS=110, the "10" on the right side of "110" indicates there is no data transmission in the present TP. If SPS=111, the "11" on the right side of "111" indicates there is no data transmission in the present TP and the next TP.

For example, SPS=001, the "0" on the left side of "001" indicates the data going to be transmitted is not the data of the present UE, and the "01" on the right side of "001"

indicates the data transmission happens in the present TP. In this way, the high layer (the service with high priority) does not need to release scheduled idle resources that are configured through SPS, the expenses of signaling are therefore reduced. The additional UE can use the idle resources for transmitting data to acquire higher efficiency. On the other hand, although there may be a collision of data transmission between other UEs based on the idle resource, the probabilities of collision is determined on the load situation. If the load is not too high, the probabilities of collision may be relatively low. In addition, as a solution for solving UE collision, the high layer (the service with high priority) still has special rights to release the specific idle resources of UE.

For the service with the medium priority, it may use the resource allocation with Quasi SA. The transmission period of the service with the medium priority can be defined and reconfigured through the high layer (i.e. high priority group). As shown in FIG. 4, there may be a number of resource pools in the data transmission part of TP2. Each resource pool is related to a SA pool. UE can select a part of resources from a SA pool that is allocated to the UE and send its data in the corresponding data pool related to the SA pool. Compared with the transmission period of 40 ms, UE gets a chance to transmit more by configuring a number of TP periods in 40 milliseconds, therefore, the latency decreases significantly. Because one SA pool corresponds to one data pool, there is no collision between the data pool and the SA pool. The collision exists only in a SA pool, and this is still solved by reconfiguring through the high layer (i.e. the service with high priority). For instance, if the load is too high or there are too many users in a SA pool or a data pool in a period, a controller will reallocate more resources to the SA pool or the data pool with high load.

Figure 6:
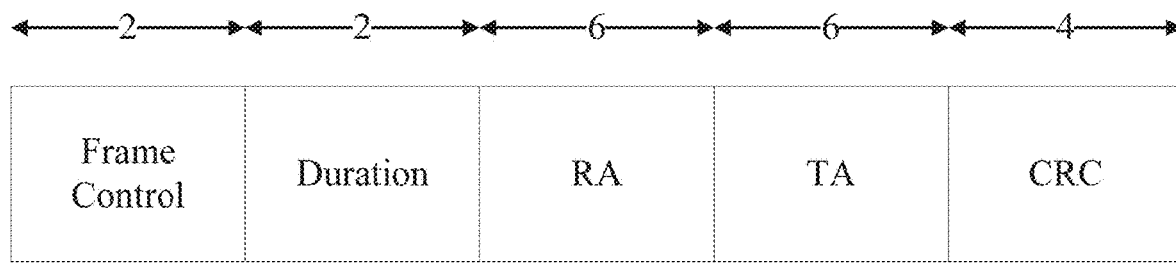
FIG. 6 is a schematic diagram of RTS format used in the method for allocating resources in a wireless mobile communication according to one concrete application embodiment of the present invention.

For the service with the lowest priority, it may use the resource allocation method with collision avoidance, wherein the transmission period of the service with the lowest priority can be set with 40 milliseconds and Carrier Sense Multiple Access with Collision Avoidance (CSMA/CA) based on collision avoidance is applied. However, as shown in FIG. 6, current CSMA that is based on Request to Send, Clear to Send (RTS/CTS) format has a total of 20 bytes, wherein Frame Control is composed of two bytes; Duration is also composed of two bytes; RA that means the address of STA (i.e. Station) is composed of four bytes; CA means the address for the sending of RTS frame by STA (i.e. Station); Transmitter Address (TA) is used for sending the next data frame, a CTS frame, an Acknowledgement (ACK) frame and the microsecond values of the duration of three SIFS frames, wherein SIFS means a short frame space for separating the transmission from a single conversation; Cyclic Redundancy Check (CRC) code that is used for detecting whether the data is changed in the transmission is composed of four bytes. However, the current RTS format is not suitable for a handshake based on a side-link. To support the transmission of a number of UEs, there is a need to make some amendments to RTS and its corresponding CTS information.

In step S204, the contention-based resource allocation method comprises a data handshake method, the data handshake method specifically comprises:

Step S241: sending, by the mobile equipment, its own equipment ID, a repeater ID and the desired resource allocation request information to the base station.

Step S242: determining, by the base station, whether the repeater accepts the resource allocation of the resource allocation request information, and if the repeater totally accepts the resource allocation, retaining the resource allocation, and if the repeater doesn't accept the resource allocation and provides new resources to the mobile equipment, assigning new resource allocation while confirming the resources.

Step S243: receiving, by the mobile equipment, resource confirmation information from the repeater and transmitting a data based on the agreed resource allocation of the resource confirmation information during the transmission of the data.

In an embodiment of the invention, the transmitting UE sends RR_V information to the target UE for requesting resources, the target UE sends RC_V information to the transmitting UE for confirming the resource request of the transmitting UE or allocating resources for the transmitting UE. RR_V information is used for indicating a resource requesting information, and RC_V information is used for indicating the confirmation of resource transmitting information. The details of RR_V format and RC_V format are described as follows:

In RR_V, UE can send its own UE ID, a repeater ID and the desired resource allocation. The UE ID can be any available format of the identifier or the address of UE, such as Temporary Mobile Subscriber Identity (TMSI), Radio Network Temporary Identity (RNTI), etc., and the repeater can be a UE that forwards the data from another UE. In RR_V, resource allocation indicates implicit/explicit frequency resources and time resources that are used for the UE, such as the number of Resource Block (RB), the coordinator of RB, the effective duration. Alternatively, implicit resource allocation can be used in a simplified version, such as assigning the number of RB only in RR_V resource allocation and assigning the format that is used for indicating the number of RB in RR_V resource allocation. In other cases, there is no need to allocate resources to RR_V and RC_V if the amount of resource request is used for a UE or all UEs. In other cases, if the repeater totally accepts the resource allocation in RR_V, the part of RC_V does not need to request resource allocation again and it can also be set as Empty. If the repeater doesn't accept RR_V and provides new resources to UE, assigning new resource allocation to the field that demands resource allocation in RC_V. Once UE receives the RC_V from the repeater node correctly, UE sends the data according to the agreed resource allocation during the data transmission. If UE doesn't receive RC_V within a period of time after sending RR_V, it should resend RR_V.

The proposed new handshake method based on V2X resource request and V2X resource allocation in Enhanced Contention Based (ECB) mode can eliminate the collisions that are caused by hidden node and perform more effective resource negotiation between UEs and therefore improve the efficiency of resource usage and reduce signaling cost.

In an illustrative embodiment, the equipment which is configured for performing the above method can be realized through one or more Application Specific Integrated Circuit (ASIC), Digital Signal Processor (DSP), Digital Signal Processor Device (DSPD), Programmable Logic Device (PLD), Field-Programmable Gate Array (FPGA), controllers, microcontrollers, microprocessors or other electronic elements.

In an illustrative embodiment, the present invention further provides a readable storage medium of non-temporary computer, which comprises instructions, such as a memory which comprises instructions. The above-mentioned instructions can be performed by the processor of equipment to complete the above-mentioned method. For example, the readable storage medium of non-temporary computer can be ROM, Random Access Memory (RAM), CD-ROM, magnetic tapes, floppy disks and optical data storage device, etc.

Figure 7:
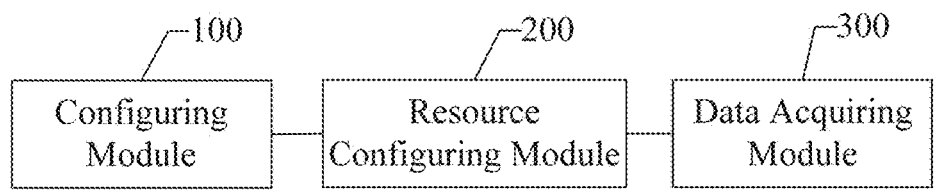
FIG. 7 is a functional block diagram of a system for allocating resources in a wireless mobile communication according to one preferred embodiment of the present invention.

The present invention further provides a functional block diagram of one preferred embodiment of a system for allocating resources in a wireless mobile communication. As shown in FIG. 7, the system comprises:

A priority configuring module 100 is configured for preconfiguring, by a base station, a priority for each data resource pool set, the details of which are in the above-mentioned embodiment of the method.

A resource configuring module 200 is configured for configuring, by a base station, a data transmission period and resource allocation for the data resource pool set based on the priority of the data resource pool set, the details of which are in the above-mentioned embodiment of the method.

A data acquiring module 300 is configured for acquiring, by a mobile equipment, a number of data resource pool sets and its corresponding relation with its configured priority in the wireless mobile communication, the details of which are in the above-mentioned embodiment of the method.

The system for allocating resources in a wireless mobile communication further comprises:

A predefining module is configured for predefining priorities of the data resource pool sets by three levels having a first priority, a second priority and a third priority, the details of which are in the above-mentioned embodiment of the method.

In the system for allocating resources in a wireless mobile communication, the resource configuring module 200 specifically comprises:

A determining unit is configured for acquiring and determining the priority of the present data resource pool set by a base station, the details of which are in the above-mentioned embodiment of the method.

A first configuring unit is configured for if the priority of the present data resource pool set is the first priority, adopting an SPSI resource allocation method for the present data resource pool set and acquiring the resource use with regard to the next data transmission period at the beginning of the first data transmission period, the details of which are in the above-mentioned embodiment of the method.

A second configuring unit is configured for if the priority of the present data resource pool set is the second priority, adopting a plan-based resource allocation method for the present data resource pool set and utilizing the plan-based resource allocation method to allocating the second data transmission period at the beginning of the second data transmission period, the details of which are in the above-mentioned embodiment of the method.

A third configuring unit is configured for if the priority of the present data resource pool set is the third priority, adopting a contention-based resource allocation method for the present data resource pool set and utilizing the contention-based resource allocation method to allocating the third data transmission period at the beginning of the third data transmission period, the details of which are in the above-mentioned embodiment of the method.

In the system for allocating resources in a wireless mobile communication, the SPSI in the first configuring unit comprises a self-resource indicator for indicating its own data or the data of other mobile equipment is transmitting and a data transmission indicator for indicating the duration of data transmission, the details of which are in the above-mentioned embodiment of the method.

In the system for allocating resources in a wireless mobile communication, the third configuring unit specifically comprises:

A request sending unit is configured for sending, by the mobile equipment, its own equipment ID, a repeater ID and the desired resource allocation request information to the base station, the details of which are in the above-mentioned embodiment of the method.

A judging unit is configured for determining, by the base station, whether the repeater accepts the resource allocation of the resource allocation request information, and if the repeater totally accepts the resource allocation, retaining the resource allocation, and if the repeater doesn't accept the resource allocation and provides new resources to the mobile equipment, assigning new resource allocation while confirming the resources, the details of which are in the above-mentioned embodiment of the method.

A transmitting unit is configured for receiving, by the mobile equipment, resource confirmation information from the repeater and transmitting a data based on the agreed resource allocation of the resource confirmation information during the transmission of the data, the details of which are in the above-mentioned embodiment of the method.

In view of the above, the present invention provides a method and a system for allocating resources in a wireless mobile communication. The method comprises: preconfiguring, by a base station, a priority for each data resource pool set; configuring, by a base station, a data transmission period and resource allocation for the data resource pool set based on the priority of the data resource pool set; and acquiring, by a mobile equipment, a number of data resource pool sets and its corresponding relation with its configured priority in the wireless mobile communication. Since the transmission period is configurable and could be updated based on the priority, the user equipment (UE) transmits the data without waiting for a very long time. Thus, the mixed resources allocation method of the present invention can reduce the transmission latency. Furthermore, indicating the resource use with regard to the next data transmission period in the transmission process in order that other users utilize the idle resources better under the condition that they don't occupy more signaling from the network side and the probabilities of collision is low. The transmission latency is therefore improved.

It should be understood that the system and the method disclosed in the embodiments of the invention may be embodied in other forms. For instance, the above-mentioned embodiment of system is merely schematic. For example, the division of modules is merely one kind of the division of logical function. There may be other approaches of division in implementing practically, such as combining a number of units or members; integrating the number of units or members into another system; ignoring some features; and stopping the division. In another point of view, the illustrated or discussed inter-coupling or direct coupling or communicating connection can be implemented via some interfaces, and the indirect coupling or the communicating connection between the systems or the units can be in the form, such as electrical, mechanical and other forms.

The units explained as separate parts may or may not be physically separate. The parts shown as units may or may not be physical units, namely can be at a place or be distributed to a number of network units. To achieve the object of the embodiment, a part of units or all of the units can be selected based on practical needs.

In addition, each functional unit in each embodiment of the present invention can be integrated into a processing unit, or exist in physical form separately. Two or more units can be also integrated into a unit. The foregoing integrated unit can be not only in a form of hardware but also in a form of hardware plus software functional unit.

The foregoing integrated unit in a form of software functional unit can be stored in a readable storage medium of computer. The foregoing software functional unit is stored in a storage medium, which comprises some instructions that is used to performing parts of the steps of the method described in each embodiment of the present invention by a computer equipment (i.e. personal computer, server, or network equipment) or a processor. The foregoing storage medium comprises: Flash-Disk, Portable Hard Disk, Read-Only Memory (ROM), Random Access Memory (RAM), magnetic disk, Optical Disk and any kind of medium that can store program codes.

It should be understood that the application of the present invention is not limited by the foregoing examples. A person of ordinary skill in the art is able to make modifications or changes based on the foregoing description, and all of these modifications and changes are within the scope of the appended claims of the present invention.

What is claimed is:

1. A method for allocating resources in a wireless mobile communication, comprising:
predefining priorities of a plurality of data resource pool sets by three levels having a first priority, a second priority, and a third priority;
acquiring preset priority configuration information from the plurality of data resource pool sets;
configuring a data transmission period and a resource corresponding to the plurality of data resource pool sets based on the preset priority configuration information of the plurality of data resource pool sets;
receiving resource allocation request information from a mobile equipment; and
sending the data transmission period and the resource corresponding to the data resource pool sets satisfying the resource allocation request information to the mobile equipment;
wherein the step of configuring the data transmission period and the resource corresponding to the plurality of data resource pool sets based on the preset priority configuration information of the plurality of data resource pool sets comprises steps of:
(B1) acquiring and determining a priority of one of the data resource pool sets by a base station;
(B2) if the priority of the one of the data resource pool sets is the first priority, adopting a Semi-persistent scheduling indicator (SPSI) resource allocation method for the one of the data resource pool sets and acquiring the resource use with regard to the next data transmission period at the beginning of a first data transmission period;
(B3) if the priority of the one of the data resource pool sets is the second priority, adopting a plan-based resource allocation method for the one of the data resource pool sets and utilizing the plan-based resource allocation method to allocating a second data transmission period at the beginning of the second data transmission period; and
(B4) if the priority of the one of the data resource pool sets is the third priority, adopting a contention-based resource allocation method for the one of the data resource pool sets and utilizing the contention-based resource allocation method to allocating a third data transmission period at the beginning of the third data transmission period.

2. The method of claim 1, wherein in step (B2), the SPSI comprises a self-resource indicator for indicating its own data or the data of other mobile equipment is transmitting and a data transmission indicator for indicating the duration of data transmission.

3. The method of claim 2, wherein in step (B4), the contention-based resource allocation method comprises a data handshake method, the data handshake method comprising:
(B41) sending, by the mobile equipment, its own equipment ID, a repeater ID and the desired resource allocation request information to the base station;
(B42) determining, by the base station, whether the repeater accepts the resource allocation of the resource allocation request information, and if the repeater totally accepts the resource allocation, retaining the resource allocation, and if the repeater doesn't accept the resource allocation and provides new resources to the mobile equipment, assigning new resource allocation while confirming the resources; and
(B43) receiving, by the mobile equipment, resource confirmation information from the repeater and transmitting a data based on the agreed resource allocation of the resource confirmation information during the transmission of the data.

4. A method for allocating resources in a wireless mobile communication, comprising:
(A) preconfiguring, by a base station, a priority for each data resource pool set;
(B) configuring, by a base station, a data transmission period and resource allocation for the data resource pool set based on the priority of the data resource pool set; and
(C) acquiring, by a mobile equipment, a number of data resource pool sets and its corresponding relation with its configured priority in the wireless mobile communication;
wherein step (A) comprises a step of predefining priorities of a plurality of data resource pool sets by three levels having a first priority, a second priority, and a third priority; and
wherein step (B) comprises steps of:
(B1) acquiring and determining a priority of one of the data resource pool sets by a base station;
(B2) if the priority of the one of the data resource pool sets is the first priority, adopting a Semi-persistent scheduling indicator (SPSI) resource allocation method for the one of the data resource pool sets and acquiring the resource use with regard to the next data transmission period at the beginning of a first data transmission period;
(B3) if the priority of the one of the data resource pool sets is the second priority, adopting a plan-based resource allocation method for the one of the data resource pool sets and utilizing the plan-based resource allocation method to allocating a second data transmission period at the beginning of the second data transmission period; and
(B4) if the priority of the one of the data resource pool sets is the third priority, adopting a contention-based resource allocation method for the one of the data resource pool sets and utilizing the contention-based resource allocation method to allocating a third data transmission period at the beginning of the third data transmission period.

5. The method of claim 4, wherein in step (B2), the SPSI comprises a self-resource indicator for indicating its own data or the data of other mobile equipment is transmitting and a data transmission indicator for indicating the duration of data transmission.

6. The method of claim 5, wherein in step (B4), the contention-based resource allocation method comprises a data handshake method, the data handshake method comprising:
   (B41) sending, by the mobile equipment, its own equipment ID, a repeater ID and the desired resource allocation request information to the base station;
   (B42) determining, by the base station, whether the repeater accepts the resource allocation of the resource allocation request information, and if the repeater totally accepts the resource allocation, retaining the resource allocation, and if the repeater doesn't accept the resource allocation and provides new resources to the mobile equipment, assigning new resource allocation while confirming the resources; and
   (B43) receiving, by the mobile equipment, resource confirmation information from the repeater and transmitting a data based on the agreed resource allocation of the resource confirmation information during the transmission of the data.

7. A system for allocating resources in a wireless mobile communication, comprising:
   one or more processors;
   a memory; and
   one or more applications stored in the memory and configured to be executed by the processors, wherein the one or more applications comprises the operating instructions for performing steps of:
      predefining priorities of a plurality of data resource pool sets by three levels having a first priority, a second priority, and a third priority;
      acquiring preset priority configuration information from the plurality of data resource pool sets;
      configuring a data transmission period and a resource corresponding to the plurality of data resource pool sets based on the preset priority configuration information of the plurality of data resource pool sets;
      receiving resource allocation request information from a mobile equipment; and
      sending the data transmission period and the resource corresponding to the data resource pool sets satisfying the resource allocation request information to the mobile equipment;
   wherein in the step of configuring the data transmission period and the resource corresponding to the plurality of data resource pool sets based on the preset priority configuration information of the plurality of data resource pool sets, the processors are configured for performing steps of:

(B1) acquiring and determining a priority of one of the data resource pool sets by a base station;
   (B2) if the priority of the one of the data resource pool sets is the first priority, adopting a Semi-persistent scheduling indicator (SPSI) resource allocation method for the one of the data resource pool sets and acquiring the resource use with regard to the next data transmission period at the beginning of a first data transmission period;
   (B3) if the priority of the one of the data resource pool sets is the second priority, adopting a plan-based resource allocation method for the one of the data resource pool sets and utilizing the plan-based resource allocation method to allocating a second data transmission period at the beginning of the second data transmission period; and
   (B4) if the priority of the one of the data resource pool sets is the third priority, adopting a contention-based resource allocation method for the one of the data resource pool sets and utilizing the contention-based resource allocation method to allocating a third data transmission period at the beginning of the third data transmission period.

8. The system of claim 7, wherein in step (B2), the SPSI comprises a self-resource indicator for indicating its own data or the data of other mobile equipment is transmitting and a data transmission indicator for indicating the duration of data transmission.

9. The system of claim 8, wherein in a data handshake method comprised in the contention-based resource allocation method in step (B4), the processors are configured for performing steps of:
   (B41) sending, by the mobile equipment, its own equipment ID, a repeater ID and the desired resource allocation request information to the base station;
   (B42) determining, by the base station, whether the repeater accepts the resource allocation of the resource allocation request information, and if the repeater totally accepts the resource allocation, retaining the resource allocation, and if the repeater doesn't accept the resource allocation and provides new resources to the mobile equipment, assigning new resource allocation while confirming the resources; and
   (B43) receiving, by the mobile equipment, resource confirmation information from the repeater and transmitting a data based on the agreed resource allocation of the resource confirmation information during the transmission of the data.

* * * * *